United States Patent Office 2,808,364
Patented Oct. 1, 1957

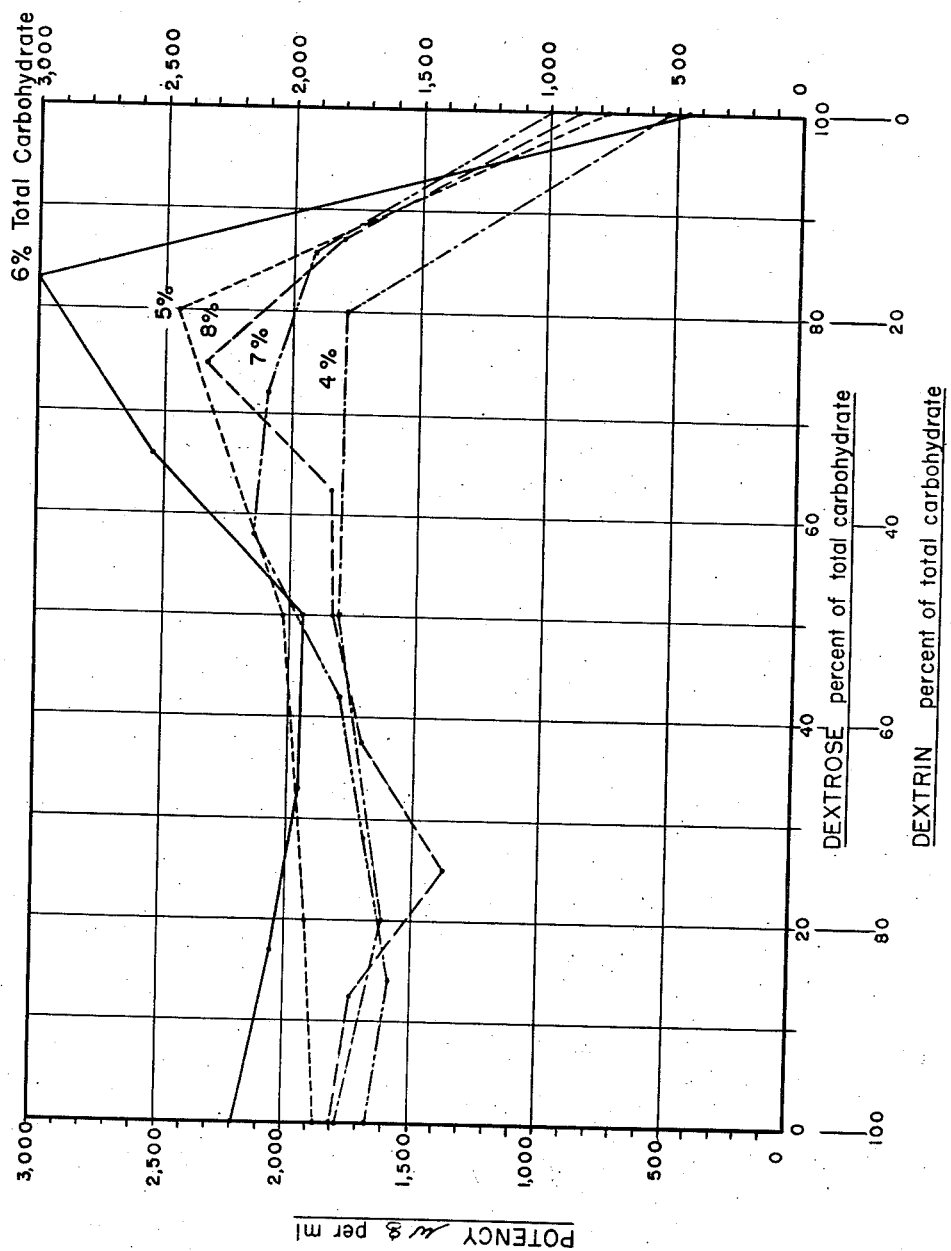

2,808,364
PRODUCTION OF STREPTOMYCIN BY CULTURE IMMUNE TO PHAGE

Fernando Carvajal, Ridgewood, N. J., assignor to Schenley Industries, Inc., New York, N. Y., a corporation of Delaware Application December 20, 1954, Serial No. 476,241

8 Claims. (Cl. 195—80)

The present invention relates to improvements in the production of streptomycin by the submerged aerobic cultivation of selected strains of the organism *Streptomyces griseus* in an essentially synthetic nutrient medium comprising dextrose and dextrin in combination as a carbohydrate source.

The organism *Streptomyces griseus* is commonly cultivated in nutrient media containing carbohydrates and natural proteins to produce streptomycin. The yields produced in known processes generally vary from batch to batch, the recovery of the streptomycin is often complicated by the presence of complex metabolic products of the natural proteins, and the growth of the organism is sometimes inhibited by the presence of bacteriophage. Other disadvantages of the so-called natural nutrient media used for streptomycin production are the excessive foaming that may occur during fermentation and the difficulty of sterilizing such natural proteins, especially soybean meal.

In accordance with the process of my invention, the yields of streptomycin are greatly increased and these other difficulties are obviated by the use of a synthetic nutrient medium whose only or principal sources of nitrogen are ammonium sulfate and sodium nitrate or similar mixtures of nontoxic inorganic ammonium salts and nitrates, which are readily available in purified or crystalline form, and whose only or principal source of carbohydrates is a mixture of dextrose and dextrin in certain definite proportions which are specified hereinafter. Although such a medium is not suitable for the growth of all strains of *Streptomyces griseus* with the resulting production of high yields of streptomycin, I found that a mutant strain of *Streptomyces griseus*, which was designated U–76, of which a culture identified at ATCC 12475 was deposited with the American Type Culture Collection, 2029 M Street, N. W., Washington 6, D. C., and which is remarkably immune to the action of bacteriophage frequently encountered in the production of streptomycin by these general methods, grows in such a medium and produces yields of streptomycin as high as 3000 or more micrograms ($\mu$g.) of streptomycin base per milliliter (ml.). With such a medium, whose composition is more readily controlled than one containing natural proteins, the yields of streptomycin are also more readily controllable and reproducible from batch to batch. Another advantage of the synthetic medium is better pH control during fermentation and consequently a deferred autolysis. This is especially important in the shake-flask screening of mutants of *Streptomyces griseus*.

For the production of streptomycin in accordance with the process of my invention, a nutrient medium having the following composition is a preferred embodiment of my invention:

| | Grams per liter |
|---|---|
| Ammonium sulfate $(NH_4)_2SO_4$ | 10.0 |
| Sodium nitrate, $NaNO_3$ | 2.0 |
| Carbohydrates as follows: | |
|   Dextrose 70% to 90% of total, dextrin 10% to 30% of total | 40 to 80 |
| Dibasic potassium phosphate, $K_2HPO_4$ | 1.0 |
| Sodium chloride, $NaCl$ | 3.0 |
| Magnesium sulfate, $MgSO_4.7H_2O$ | 0.2 |
| Ferrous sulfate, $FeSO_4.7H_2O$ | 0.03 |
| Zinc sulfate, $ZnSO_4.7H_2O$ | 0.03 |
| Manganous sulfate, $MnSO_4.4H_2O$ | 0.01 |
| Calcium carbonate, $CaCO_3$ | 10.0 |
| Distilled water to 1 liter. | |

Before the addition of the calcium carbonate, the medium is adjusted to a pH in the range of 7.5 to 8.0 (preferably 7.5). The calcium carbonate is then added and the medium is sterilized in the conventional manner. After sterilization, the pH of the medium falls within the range 6.5 to 7.0. The production of streptomycin with this medium otherwise contemplates no changes in the process of cultivating a strain of *Streptomyces griseus* in the medium at prevailing room temperatures, or preferably between 75 and 80° F. (24 and 27° C.), and recovery of the streptomycin by conventional methods.

In several experiments, a total of 16 shake flasks using the above preferred synthetic medium gave an average yield of 3700 $\mu$g. per ml. with a range from 3000 $\mu$g. per ml. to 4300 $\mu$g. per ml. The carbohydrate concentrations in these experiments were 40 grams of dextrose and 10 grams of dextrin per liter. These results are typical of those obtained in numerous other shake-flask experiments.

Instead of the mixture of ammonium sulfate and sodium nitrate which is specified in the foregoing preferred medium, other simple nontoxic ammonium salts and nitrates may be used. Thus, for example, a mixture of ammonium phosphate and potassium nitrate may be used, in which event it may be desirable to compensate for the phosphate ion thus added by reducing the quantity of potassium phosphate in the medium. Likewise, other phosphate salts, for example, sodium phosphate, may be used to replace potassium phosphate providing the potassium ion concentration is brought to a suitable level by addition of other potassium salts. The proportions of the constituents of the medium other than the carbohydrates may be varied generally within the ranges used in media of this character, but the carbohydrate content should be maintained in excess of approximately 4% and less than approximately 8% and preferably between 5 and 6%, and should consist, as specified, of a mixture of from approximately 70 to 90% of dextrose and from approximately 10 to 30% of dextrin, and preferably a mixture containing 75 to 85% of dextrose and 15 to 25% of dextrin.

Although I specify a dextrin and dextrose as the sources of carbohydrates, the dextrose may be replaced, either wholly or in part, by sucrose and other disaccharides that yield dextrose by hydrolysis. Enzymes formed during the growth of the organism promote such hydrolysis of polysaccharides. Dextrins are starches which have been converted by torrefaction, either with or without acid or base catalysts, or by enzymatic action, to polysaccharides of lower molecular weight. Within the scope of this term are to be understood to be included such starch products as the so-called soluble starches and the commercial dextrins which are sold as such or under various trade-mark designations, and which are referred to generally as water-soluble dextrins.

In another embodiment of my invention, small amounts of natural proteins are added to the foregoing preferred synthetic medium. A preferred addition is approximately 1 gram of corn-steep liquor per liter of medium. Other natural proteins such as soybean meal and peanut meal may be used, either separately or in combination with each other. It should be emphasized that these additions of natural proteins are not essential to high streptomycin yields but may be used if desired for other purposes, such as speeding up production. Also, the addition of these small amounts (up to 10 grams per liter of medium) of natural proteins does not impair the many advantages of the synthetic medium. As examples of this embodiment, the following yields of streptomycin were obtained in the pilot plant using the U-76 strain of *Streptomyces griseus* (ATCC-12475) and the foregoing preferred synthetic medium containing in addition 1.0 gram per liter of corn-steep liquor:

2600 μg. per ml. in 96 hours
3100 μg. per ml. in 120 hours

Similar high yields, as follows, were obtained when 1.0 gram of soybean meal was added to the preferred synthetic medium:

3000 μg. per ml. in 96 hours
3400 μg. per ml. in 120 hours

In still another embodiment of my invention, the addition of approximately 10 grams of corn-steep liquor per liter to the preferred synthetic medium has been used. Even with this high level of natural protein substances, some of the advantages of the synthetic media are retained. For example, there is still much less foaming during fermentation than with the wholly-natural medium, and, in addition, the difficulty of sterilizing large amounts of soybean meal is circumvented. As examples of this embodiment, the following yields of streptomycin, indicative of the constancy of the results, were obtained in individual pilot-plant runs:

3500 μg. per ml. in 120 hours
3700 μg. per ml. in 120 hours
3900 μg. per ml. in 120 hours
3400 μg. per ml. in 96 hours It will be obvious to those skilled in the art that conventional variations may be made in the synthetic medium and that various natural proteins may if desired be added to the synthetic medium, either separately or in combination, and at various levels. It is to be understood that my invention is not restricted or limited in any way by the above examples and embodiments, all of which are given merely for purposes of illustrating my invention.

The U-76 strain of *Streptomyces griseus* (ATTC 12475) is a bacteriophage-immune strain of this organism which originated from a sample of Ohio river mud collected at Lawrenceburg, Indiana, in March 1945. A single colony grown from an ultraviolet-irradiated spore suspension of that culture, which was plated out on an agar medium containing 250 micrograms of streptomycin per milliliter, was isolated. A suspension of the spores of a culture from that isolate was subsequently irradiated with ultraviolet light and another single colony was plated from an agar medium containing 250 micrograms per milliliter of streptomycin. A suspension of spores grown from this colony was then mixed with a filtrate of a bacteriophage-active liquid and these spores were cultivated in a liquid medium and subsequently plated out on agar containing 250 micrograms of streptomycin per milliliter, from which a phage-immune colony was selected. The final U-76 strain was obtained by plating out in agar containing 50 micrograms of streptomycin per milliliter a spore suspension of this phage-immune colony that had been again irradiated with ultraviolet light.

Although I prefer to use this bacteriophage-immune U-76 strain and its descendants and mutants with the medium described herein to obtain the specified high streptomycin yields, obviously other closely related strains and mutants, whether or not they are susceptible to bacteriophage degradation, may also thrive in this medium and produce high streptomycin yields.

As examples of the ability of the U-76 strain and its descendants and mutants to produce superior streptomycin yields in synthetic media, comparisons were made with another strain of *Streptomyces griseus* designated as S-1 and previously used in streptomycin production. The average peak yields obtained in 11 shake flasks were compared, using these two strains and the same preferred synthetic medium. The following peak yield results were obtained:

μg. per ml.
U-76 strain of *S. griseus* _____ 3200
S-1 strain of *S. griseus* _____ 1200

In each case the medium contained 1.0 gram of corn-steep liquor per liter.

To illustrate preferred methods of practicing the process of my invention and of the improved results obtained, comparative experiments were conducted with the preferred medium specified hereinabove, but containing in addition 1.0 gram per liter of corn-steep liquor (penicillin grade containing approximately 50% by weight of nonvolatile solids), the dextose-dextrin ratios of which were varied while the total carbohydrate concentrations were maintained at respectively 4%, 5%, 6%, 7% and 8%. The U-76 strain of *Streptomyces griseus* (ATCC 12475) was used and the dextrin was A. E. Staley & Co. Staclipse No. 1. Each of these experiments was performed in triplicate in shake flasks and the maximum (peak) potency obtained in each was determined. The streptomycin content was assayed periodically by the conventional microbiological assay method using *Staphylococcus aureus* ATCC 9996 as the standard organism. The averages of the triplicates of each experiment that were thus obtained were as follows. These results are plotted in the graph constituting the drawing accompanying this application.

*Effect of dextrose-dextrin ratio on streptomycin yield*

| | Dextrose (Percent by Wt.) | Dextrin (Percent by Wt.) | Peak Yields (μg./ml.) |
|---|---|---|---|
| Total Carbohydrates, 4% | 4.0 | 0.0 | 540 |
| | 3.2 | 0.8 | 1,790 |
| | 2.0 | 2.0 | 1,800 |
| | 0.8 | 3.2 | 1,610 |
| | 0.0 | 4.0 | 1,780 |
| Total Carbohydrates, 5% | 5.0 | 0.0 | 770 |
| | 4.0 | 1.0 | 2,450 |
| | 2.5 | 2.5 | 2,020 |
| | 1.0 | 4.0 | 1,910 |
| | 0.0 | 5.0 | 1,865 |
| Total Carbohydrates, 6% | 6.0 | 0.0 | 480 |
| | 5.0 | 1.0 | 3,000 |
| | 4.0 | 2.0 | 2,540 |
| | 3.0 | 3.0 | 1,940 |
| | 2.0 | 4.0 | 1,950 |
| | 1.0 | 5.0 | 2,055 |
| | 0.0 | 6.0 | 2,190 |
| Total Carbohydrates, 7% | 7.0 | 0.0 | 1,000 |
| | 6.0 | 1.0 | 1,910 |
| | 5.0 | 2.0 | 2,090 |
| | 4.0 | 3.0 | 2,140 |
| | 3.0 | 4.0 | 1,790 |
| | 2.0 | 5.0 | 1,680 |
| | 1.0 | 6.0 | 1,580 |
| | 0.0 | 7.0 | 1,660 |
| Total Carbohydrates, 8% | 8.0 | 0.0 | 890 |
| | 7.0 | 1.0 | 1,795 |
| | 6.0 | 2.0 | 2,340 |
| | 5.0 | 3.0 | 1,830 |
| | 4.0 | 4.0 | 1,820 |
| | 3.0 | 5.0 | 1,700 |
| | 2.0 | 6.0 | 1,370 |
| | 1.0 | 7.0 | 1,730 |
| | 0.0 | 8.0 | 1,800 |

Inasmuch as the foregoing specification comprises preferred embodiments of my invention, it is to be understood that the invention is not restricted thereto, and that modifications and variations in conventional manner may be made therein without departing from the invention, which is limited only by the scope of the appended claims.

I claim:

1. A process for the production of streptomycin which comprises the aerobic cultivation of the ATCC 12475 streptomycin-producing strain of the organism *Streptomyces griseus* in a nutrient medium comprising nontoxic ammonium and nitrate salts as the principal nitrogen sources and, as the carbohydrate source, between approximately 4 and approximately 8% by weight/volume of a mixture of a water-soluble dextrin and a saccharide of the group consisting of dextrose and disaccharides that are hydrolyzable to dextrose, the dextrin content of the carbohydrate source constituting between approximately 10 and approximately 30% by weight of the mixture, and subsequently recovering the streptomycin from the resulting broth.

2. A process as defined in claim 1 in which the total carbohydrate content of the medium is between approximately 5 and approximately 6% by weight/volume and the dextrin content of the carbohydrate mixture is between approximately 15 and approximately 25% by weight.

3. A process as defined in claim 1 in which the total carbohydrate source consists of between approximately 5 and approximately 6% by weight/volume of the medium, and consists of a mixture of water-soluble dextrin and dextrose, of which the dextrin consists of between 10 and 30% by weight of the mixture.

4. A process as defined in claim 1 in which the ammonium salt is ammonium sulfate and the nitrate salt is sodium nitrate.

5. A process for the production of streptomycin which comprises the aerobic cultivation of the streptomycin-producing bacteriophage-immune ATTC 12475 strain of *Streptomyces griseus* in an aqueous nutrient medium comprising the following substances in approximately the following proportions specified in grams per liter:

| | Grams per liter |
|---|---|
| Ammonium sulfate | 10.0 |
| Sodium nitrate | 2.0 |
| Carbohydrates | 40 to 80 |
| Potassium phosphate | 1.0 |
| Sodium chloride | 3.0 | together with small proportions of nontoxic megnesium, ferrous, zinc and manganous salts, and in which the carbohydrates consist of a mixture of dextrose and a water-soluble dextrin, the dextrin content of which is between 10 and 30% by weight of the carbohydrate mixture, and subsequently recovering the streptomycin from the resulting broth.

6. A process as defined in claim 5 in which the medium also comprises corn-steep liquor in a proportion between approximately 1 and approximately 10 grams per liter.

7. A process as defined in claim 5 in which the medium also comprises soybean meal in a proportion between approximately 1 and approximately 10 grams per liter.

8. A process as defined in claim 5 in which the medium also comprises approximately 1 gram per liter of corn-steep liquor.

References Cited in the file of this patent

UNITED STATES PATENTS 2,516,682  Donovick _____ July 25, 1950

FOREIGN PATENTS 635,529  Great Britain _____ Apr. 12, 1950

OTHER REFERENCES

La Manna et al.: Basic Bacteriology, 1953, Williams and Wilkins, pages 28–29.